Jan. 12, 1960 E. J. POLLEY 2,920,490

PHONOGRAPH DRIVE

Filed April 27, 1955 2 Sheets-Sheet 1

EUGENE J. POLLEY
*INVENTOR.*

*BY* John J. Pederson

HIS ATTORNEY.

Jan. 12, 1960 E. J. POLLEY 2,920,490

PHONOGRAPH DRIVE

Filed April 27, 1955 2 Sheets-Sheet 2

EUGENE J. POLLEY.
*INVENTOR.*

BY John J. Pederson

HIS ATTORNEY.

United States Patent Office 2,920,490

Patented Jan. 12, 1960

2,920,490

PHONOGRAPH DRIVE

Eugene J. Polley, Lombard, Ill., assignor to Zenith Radio Corporation, a corporation of Delaware Application April 27, 1955, Serial No. 504,141

8 Claims. (Cl. 74—208)

This invention relates to phonographs and more particularly to drive systems for use in phonographs and record players.

Early phonographs employed direct gear drive systems between the motor and the turntable to translate the motor output into rotation of the turntable. About twenty years ago, a friction drive system comprising an idler wheel between the motor and the turntable was introduced for reasons of economy and to reduce objectionable "rumble" and "wow" in the output; the idler wheel has fulfilled its expectations in these respects. More recently, several types of record discs, produced to be played at different speeds, have become commercially available. The idler wheel is sufficiently versatile to be adapted to the function of speed change in a phonograph; for example, by employing a stepped drive shaft and displacing the idler wheel along its axis of rotation, the angular velocity of the turntable may be varied. Another idler wheel modification was occasioned by the commercial demand for the utmost in fidelity of reproduction; attention has been focussed on the elimination of every possible mechanical source of distortion in a phonograph driving system. To this end, the phonograph mechanism may include a motor which imparts rotation to a main drive wheel. An idler wheel is positioned intermediate the main drive wheel and the turntable to couple the angular motion of the drive wheel to the turntable. When the motor is de-energized the elements of the system come to rest, and in this condition some compressive force is exerted upon the idler wheel by the turntable and the drive wheel. After a considerable number of starting and stopping times, with intervening periods when the phonograph often remains in the "off" position for days on end, the compressive stress applied to the idler wheel by the turntable and the drive wheel develops flat spots on the idler wheel. These flat spots result in imperfect transmission of angular motion to the turntable, and these imperfections may be detected as wow or rumble in the phonograph output.

To prevent the development of flat spots on the idler wheel, a clutch mechanism may be introduced to disengage the idler wheel from either the turntable or the drive wheel, or both, when the phonograph is not in use; the clutch must likewise effect frictional engagement between the idler wheel and both the drive wheel and the turntable when the phonograph is in operation. Various methods may be utilized to accomplish this, such as a spring which is manually tripped by a separate switch when the phonograph is turned on and off, or a solenoid which moves a metal core to effect the engagement and disengagement. A considerable amount of force is usually necessary to position the idler wheel with certainty, and this requirement militates against the employment of a movable idler wheel for speed control purposes. The compact, highly specialized mechanisms used in modern phonographs do not leave much space for the installation of features not absolutely required. If some additional equipment, such as a movable idler wheel, is to be incorporated, it is desirable that the mechanism be as compact, simple, and positive in operation as possible.

It is an object of this invention to provide a coupling mechanism including an idler wheel between a phonograph motor and turntable, mounted so that the idler wheel may be disengaged from frictional contact with the drive wheel or the turntable, or both, when the phonograph is not in operation.

It is a further object of the invention to provide a novel drive system for effecting engagement and disengagement of the idler wheel with the drive wheel and the turntable.

Yet another object of the invention is to accomplish these ends with a mechanism which is simple and sturdy, compact and easy to install, and precise and certain in its operation.

In accordance with the present invention, a phonograph comprises a driven element constituted by a rotatable turntable and further comprises a motor having a rotatable driving element. There are clutch means including a movable member normally disengaged from at least one of the aforesaid driving and driven elements but operable to complete a mechanical driving connection from the driving element to the turntable. Finally, fluid actuating means responsive to rotation of the driving element is provided for operating the clutch means to complete a driving connection and translate rotational movement from the motor to the turntable.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
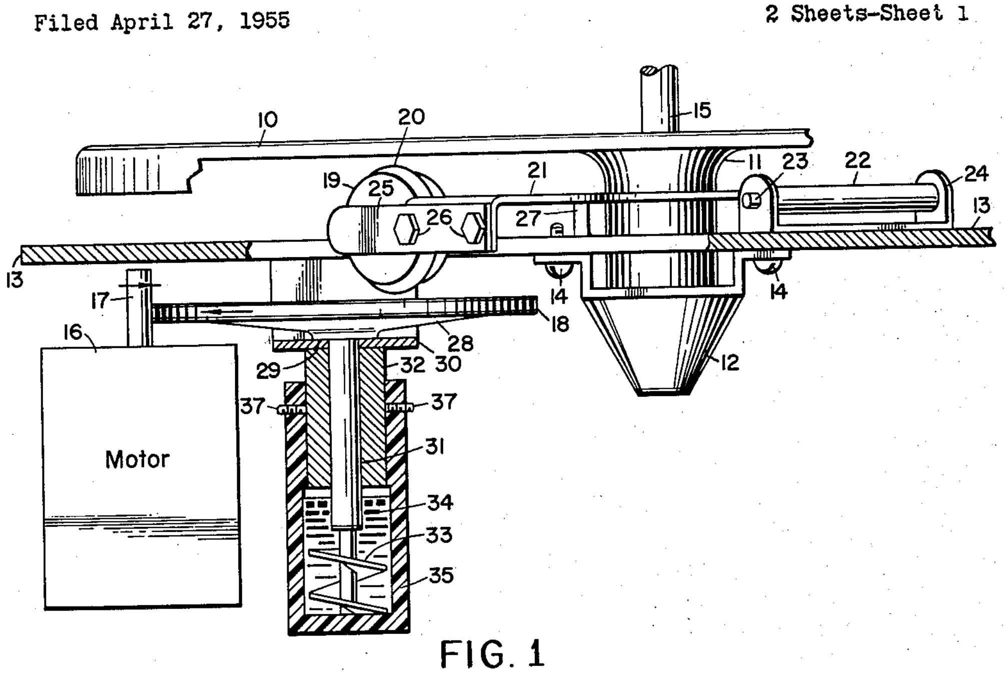
Figure 1 is a fragmentary side view, partly in section, of a preferred embodiment of the invention.

In Figure 1, the elements associated with the fluid medium (to be described more fully hereinafter) are shown in section. A turntable 10 is joined to a hub 11, the lower end of which is journalled in a bearing (not shown) contained within a bearing support 12. Bearing support 12 is secured to a chassis plate 13 by two screws 14 which are threaded into corresponding holes in chassis plate 13. A spindle 15 is inserted through a bearing (not shown) mounted within the central portion of hub 11.

A turntable motor 16 has a rotatable driving rod or shaft 17, which is coupled by frictional engagement to the circumferential surface of a drive wheel 18, which may be constructed with a rim of rubber or the like to provide quiet operation. An idler wheel 19, having a narrow, resilient, central ridge 20 of rubber or the like, is mounted on a support arm 21, one end of which is terminated in a hollow cylindrical member 22 journalled on a cylindrical pin 23. Cylindrical pin 23 is fixed to a mounting bracket 24 affixed by welding or other means to chassis plate 13. The connection of support arm 21 to bracket 24 by cylindrical pin 23 permits rotation of support arm 21 about an axis coincident with the center line of pin 23. One side of idler wheel 19 is terminated in a shaft 53 which is journalled in a corresponding bearing aperture of support arm 21 (better seen in Figure 3); the opposite side of the idler wheel 19 is terminated in a shaft 54 (better seen in Figure 3), which extends into a bracket 25 fastened by two bolts 26 to support arm 21. A mechanical stop 27, a supporting piece struck from and bent at right angles to chassis 13, limits the rotation of support arm 21 about the axis of pin 23 in a counterclockwise direction, as viewed in Figure 1.

The lower portion of drive wheel 18 includes a projection 28 which generally resesmbles a truncated cone, the lower surface 29 of which rests on one surface of a support bracket 30 which is affixed to the underside of chassis plate 13. A shaft 31 is coaxially joined to lower surface 29 of drive wheel 18, and shaft 31 is journalled in a combination thrust and rotation bearing or bushing 32 which permits both longitudinal and rotational movement of shaft 31. A propeller screw 33 is so constructed that, viewed from top or bottom, the screw circumference winds in a counterclockwise direction toward the other end. Propeller screw 33 is coaxially mounted on the lower portion of shaft 31, and propeller screw 33 is immersed in a viscous fluid 34 contained in a hollow chamber 35 which may be constructed either of metal or of molded or extruded plastic material. Two set screws 37 inserted through the upper portion of chamber 35 provide a firm connection between bushing 32 and chamber 35. The viscosity of the fluid contained in chamber 35 is sufficiently great that rotation of propeller screw 33 develops an upward thrust which is transmitted through shaft 31 to drive wheel 18; in this embodiment, the fluid used was polyalkylene glycol, having a viscosity of 90,000 Saybolt seconds at 210° F.

Figure 3:
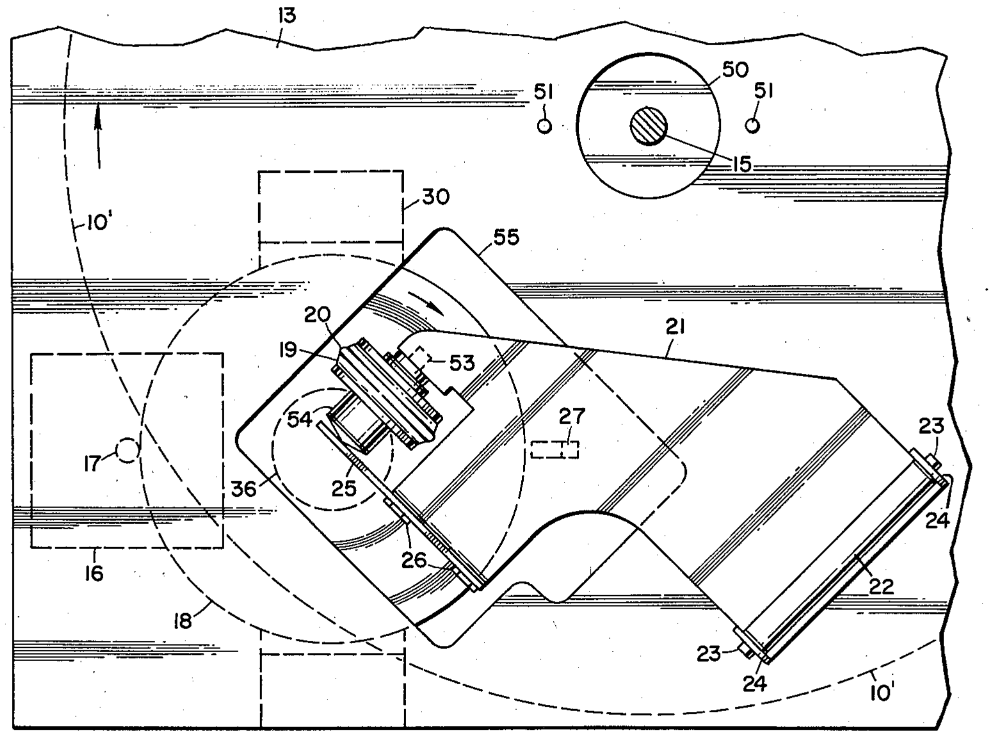
Figure 3 is a fragmentary top view of the embodiment of Figure 1.

In the fragmentary top view of Figure 3, turntable 10 has been removed, but a broken line 10' shows the normal position of the outside rim of the turntable. A round aperture 50 is provided in chassis plate 13 to receive hub 11 of turntable 10, and spindle 15 insures correct centering of hub 11. Threaded holes 51 are adapted to receive two screws 14 which secure bearing support 12 to the underside of chassis plate 13. The outline of motor 16 is shown, with driving rod 17 contacting the outer periphery of drive wheel 18.

Idler wheel 19 is positioned in registration with a cut-out portion 55 of chassis plate 13 by support arm 21 and supported by a shaft 53 which is received by a corresponding aperture in support arm 21, and by a shaft 54 which has a beveled surface fitted into a mating indentation of bracket 25. Thus idler wheel 19 may be displaced in a vertical direction as support arm 21 pivots about cylindrical pin 23; aperture 55 is positioned in chassis plate 13 to permit frictional engagement of idler wheel 19 with both drive wheel 18 and turntable 10. Although the illustrated embodiment of the invention is a single-speed record player, a speed control mechanism may, of course, be provided to selectively displace the idler wheel along its axis of rotation to alter the angular velocity of the turntable.

Figure 2:
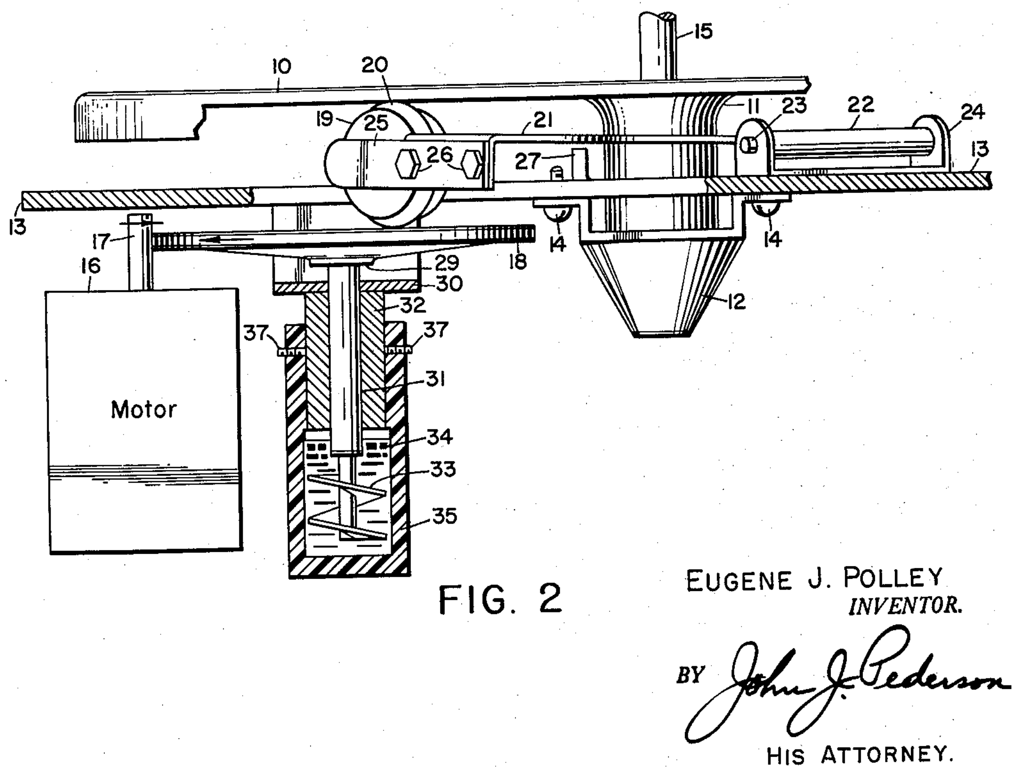
Figure 2 is a fragmentary side view, partly in section, of the embodiment of Figure 1 in another position.

The operation of the invention may best be understood by reference to Figure 1 and Figure 2. In Figure 1 the phonograph embodying the invention is shown at rest; motor 16 is de-energized. When motor 16 is energized by completing the circuit (not shown) which supplies power to motor 16, driving rod 17 is rotated. Drive wheel 18 is in frictional contact with driving rod 17, and therefore drive wheel 18 is likewise rotated. Shaft 31 and propeller screw 33 are coaxially affixed to drive wheel 18; therefore the rotation of driving rod 17 is transmitted to propeller screw 33. To the rotative action of propeller screw 33 in the viscous fluid medium 34, there is a reaction or resistance by the oil; this reaction is transmitted as an upward thrust through propeller screw 33 and shaft 31 to drive wheel 18 and moves drive wheel 18 upwardly. As drive wheel 18 is moved it engages idler wheel 19 and also moves idler wheel 19 upwardly, pivoting support arm 21 about cylindrical pin 23 in mounting bracket 24. Drive wheel 18 is urged upwardly until the upper edge of idler wheel 19 makes contact with turntable 10 as shown in Figure 2. Turntable 10, because of its weight and mounting in bearing support 12, is not displaced by this movement, but angular rotation of turntable 10 is effected by the translation of such motion from drive wheel 18 through idler wheel 19 to turntable 10. Resilient ridge 20 on idler wheel 19 affords positive frictional engagement of idler wheel 19 with both drive wheel 18 and turntable 10. This operation occurs whenever motor 16 is enregized and propeller screw 33 is rotated in the fluid medium.

Upon de-energization of motor 16, propeller screw 33 is no longer rotated. The reaction of the fluid medium on propeller screw 33 disappears, and therefore the assembly consisting of drive wheel 18, shaft 31 and propeller screw 33 moves downwardly due to gravitation to resume its initial or de-energized position shown in Figure 1. As the assembly moves, idler wheel 19 again moves downwardly, support arm 21 pivoting about cylindrical pin 23; if desired, this movement may be arrested by mechanical stop 27 affixed to mounting bracket 24 in order that idler wheel 19 may be removed from engagement with both drive wheel 18 and turntable 10. Thus idler wheel 19 is relieved of, and maintained free from, compressive stress when the phonograph is not running, and undesirable flat spots on the idler wheel are effectively avoided by reason of this decoupling between turntable 10 and drive wheel 18.

Thus, the invention provides for the disengagement of a phonograph idler wheel from the drive wheel, the turntable, or both elements when the phonograph is not in operation, thus preventing flattening of the resilient outer portion of the idler wheel and precluding the posibility of rumble and wow which normally results from irregular rotation of the turntable. The disengegement is accomplished with a compact and reliable mechanism. The phonograph motor imparts rotation to the drive wheel; the fluid coupling means of the invention responds to the rotation of the motor drive shaft or the drive wheel to develop a longitudinal thrust for displacing the drive wheel upwardly, thereby effecting frictional engagement between the idler wheel and both the turntable and the drive wheel. When the phonograph motor is de-energized, rotation of the drive wheel ceases; therefore the upward thrust is dissipated and the drive wheel is lowered by gravity to its normal position, in which compressive stresses in the idler wheel are relieved. A constant angular velocity is thus imparted to the turntable because the idler wheel retains its uniform circumference, there being no possibility of compressive stresses developing flat spots. The fluid coupling device is compact, inexpensive, and admits to easy installation in a phonograph.

While a particular embodiment of the invention has been shown and described, it is apparent that modifications and alternations may be made thereto, and it is intended in the appended claims to cover all such modifications or alterations as may fall within the true spirit and scope of the invention.

I claim:

1. A phonograph comprising: a turntable; a motor having a rotatable driving element; a drive wheel coupled to said driving element; an idler wheel; means normally supporting said ider wheel between said drive wheel and said turntable in a condition substantially relieved of compressive stress, whereby said turntable is decoupled from said drive wheel; and fluid coupling means responsive to rotation of said drive wheel for moving said idler wheel into frictional engagement with both said drive wheel and said turntable.

2. A phonograph comprising: a chassis; a turntable; a motor having a rotatable driving element; a drive wheel mounted in a plane substantially parallel to that of said turntable, and coupled to said driving element; a support arm pivotally mounted to said chassis about an axis parallel to said turntable; an idler wheel rotatably mounted on said support arm in a plane substantially perpendicular to that of said turntable mounted about an axis in a condition substantially free from compressive stress, whereby said turntable is decoupled from said drive wheel; and fluid coupling means responsive to rotation of said drive wheel for displacing said drive wheel to effect frictional engagement between said idler wheel and both said drive wheel and said turntable.

3. A phonograph comprising: a turntable; a motor having a rotatable driving element; a thrust bearing; a shaft journalled in said thrust bearing for longitudinal and rotational movement therein; a drive wheel fixed to said shaft and coupled to said driving element; an idler wheel; movable means for supporting said idler wheel between said drive wheel and said turntable; and fluid coupling means responsive to rotation of said drive wheel for moving said idler wheel into frictional engagement with both said drive wheel and said turntable.

4. A phonograph comprising: a turntable having a horizontal record-supporting surface; a motor having a rotatable driving element; a thrust bearing; a shaft journalled in said thrust bearing for longitudinal and rotational movement therein; a drive wheel, substantially parallel to said surface, fixed to said shaft and coupled to said driving element; an idler wheel; means pivotable about a horizontal axis for movably supporting said idler wheel between said drive wheel and said turntable; and fluid coupling means responsive to said rotation of said drive wheel for effecting a thrust of said shaft in said bearing toward said turntable to cause said support member to pivot about said axis and bring said idler wheel into frictional engagement with both said drive wheel and said turntable.

5. A phonograph comprising: a chassis plate; a turntable mounted on said chassis plate for rotation in a horizontal plane; a motor having a rotatable driving element; a vertical thrust bearing fixed to said chassis plate; a shaft journalled in said thrust bearing for longitudinal and rotational movement therein; a drive wheel fixed to said shaft and coupled to said driving element; a support arm pivotally mounted to said chassis plate about a horizontal axis; a resilient idler wheel rotatably mounted on said support arm in a vertical plane between said drive wheel and said turntable in a condition substantially free from compressive stress, whereby said turntable is decoupled from said drive wheel; and fluid coupling means responsive only to rotation of said drive wheel for effecting an upward thrust of said shaft in said bearing for pivoting said support arm about said axis to effect frictional engagement of said idler wheel with both said drive and said turntable and translate rotational movement of said driving element to said turntable, whereby said idler wheel is relieved of compressive stress upon de-energization of said motor.

6. A phonograph comprising: a chassis plate; a turntable mounted on said chassis plate for rotation in a horizontal plane; a motor having a rotatable driving element; a vertical thrust bearing fixed to said chassis plate; a shaft journalled in said thrust bearing for longitudinal and rotational movement therein; a drive wheel fixed to said shaft and coupled to said driving element; a support arm pivotally mounted to said chassis plate about a horizontal axis; a resilient idler wheel rotatably mounted on said support arm in a vertical plane between said drive wheel and said turntable in a position spaced from both said drive wheel and said turntable; and fluid coupling means responsive only to rotation of said drive wheel for effecting an upward thrust of said shaft in said bearing for pivoting said support arm about said axis to effect frictional engagement of said idler wheel with both said drive wheel and said turntable and translate rotational movement of said driving element to said turntable, whereby said idler wheel is relieved of compressive stress upon de-energization of said motor.

7. A phonograph comprising: a chassis plate; a turntable mounted on said chassis plate for rotation in a horizontal plane; a motor having a rotatable driving element; a vertical thrust bearing fixed to said chassis plate; a shaft journalled in said thrust bearing for longitudinal and rotational movement therein; a drive wheel fixed to one end of said shaft and coupled to said driving element; a support arm pivotally mounted to said chassis plate about a horizontal axis; a resilient idler wheel rotatably mounted on said support arm in a vertical plane between said drive wheel and said turntable in a condition substantially free from compressive stress, whereby said turntable is decoupled from said drive wheel; and fluid coupling means, including a reservoir of viscous fluid and a propeller element fixed to the other end of said shaft and immersed in said fluid, responsive only to rotation of said propeller element to develop and transmit an upward thrust to said shaft and said drive wheel and effect frictional engagement of said idler wheel with both said drive wheel and said turntable, whereby said idler wheel is relieved of compressive stress upon de-energization of said motor.

8. A phonograph comprising: a driven element comprising a rotatable turntable; a motor having a rotatable driving element; clutch means including a movable member normally disengaged from at least one of said elements and operable to complete a mechanical driving connection from said driving element to said turntable; and fluid actuated means responsive to rotation of said driving element for operating said clutch means by moving said member to complete said driving connection and translate rotational movement from said motor to said turntable.

References Cited in the file of this patent

UNITED STATES PATENTS

| | | |
|---|---|---|
| 632,944 | Jansen | Sept. 12, 1899 |
| 849,051 | Churchward | Apr. 2, 1907 |
| 1,778,756 | Elmer | Oct. 21, 1930 |
| 2,080,279 | Kellogg | May 11, 1937 |
| 2,485,848 | Sharp | Oct. 25, 1949 |
| 2,661,596 | Winslow | Dec. 8, 1953 |
| 2,722,296 | Stoeckicht | Nov. 1, 1955 |
| 2,733,796 | McMillan et al. | Feb. 7, 1956 |